US012551930B2

(12) United States Patent
Bergmann et al.

(10) Patent No.: US 12,551,930 B2
(45) Date of Patent: Feb. 17, 2026

(54) METHOD AND DEVICE FOR SORTING SILICON FRAGMENTS

(71) Applicant: Wacker Chemie AG, Munich (DE)

(72) Inventors: Franz Bergmann, Munich (DE); Thomas Schröck, Munich (DE)

( * ) Notice: Subject to any disclaimer, the term of this patent is extended or adjusted under 35 U.S.C. 154(b) by 0 days.

(21) Appl. No.: 18/718,824

(22) PCT Filed: Oct. 24, 2022

(86) PCT No.: PCT/EP2022/079552

§ 371 (c)(1), (2) Date: Jun. 12, 2024

(87) PCT Pub. No.: WO2024/088498

PCT Pub. Date: May 2, 2024

(65) Prior Publication Data

US 2025/0065373 A1 Feb. 27, 2025

(51) Int. Cl.
*B07C 5/10* (2006.01)
*B07C 5/36* (2006.01)

(52) U.S. Cl.
CPC ................ *B07C 5/10* (2013.01); *B07C 5/368* (2013.01); *B07C 2501/0018* (2013.01)

(58) Field of Classification Search
CPC .... B07C 5/368; B07C 5/10; B07C 2501/0018
See application file for complete search history.

(56) References Cited

U.S. PATENT DOCUMENTS

| | | | |
|---|---|---|---|
| 6,265,683 B1 | 7/2001 | Flottmann et al. | |
| 6,375,011 B1 | 4/2002 | Flottmann et al. | |
| 9,613,300 B2 * | 4/2017 | Tin | G06V 20/647 |
| 11,383,936 B1 * | 7/2022 | Brouchoud | B08B 3/022 |
| 12,131,524 B2 * | 10/2024 | Horowitz | G06F 18/41 |
| 2007/0235574 A1 * | 10/2007 | Schaefer | C01B 33/02 241/36 |
| 2008/0023294 A1 * | 1/2008 | Moore | B65G 47/841 198/370.02 |
| 2009/0021751 A1 * | 1/2009 | Jonasson Bjarang | B07C 5/3425 356/601 |
| 2013/0126399 A1 * | 5/2013 | Wolff | B07C 5/342 209/555 |
| 2021/0129188 A1 * | 5/2021 | Borrowman | G01N 21/85 |
| 2022/0347724 A1 * | 11/2022 | Fourney | B07C 5/36 |
| 2023/0011307 A1 * | 1/2023 | Schröck | G06T 7/521 |

FOREIGN PATENT DOCUMENTS

| | | |
|---|---|---|
| EP | 0983804 A1 | 3/2000 |
| TW | 202126578 A | 7/2021 |
| WO | 2015017623 A1 | 2/2015 |

* cited by examiner

*Primary Examiner* — Joseph C Rodriguez

(57) ABSTRACT

Methods and devices for sorting silicon fragments. The method includes the steps of singulating the chunks in a singulating region and recording the projected area of a chunk in a 2D profile plane with at least one first measuring device. Recording at least one height information item above and/or below the 2D profile plane with at least one further measuring device. Calculating the size of the chunk from the projected area and the height information item and controlling at least one deflecting device as a function of the calculated size.

11 Claims, 1 Drawing Sheet

METHOD AND DEVICE FOR SORTING SILICON FRAGMENTS

CROSS-REFERENCE TO RELATED APPLICATIONS

Figure 1:
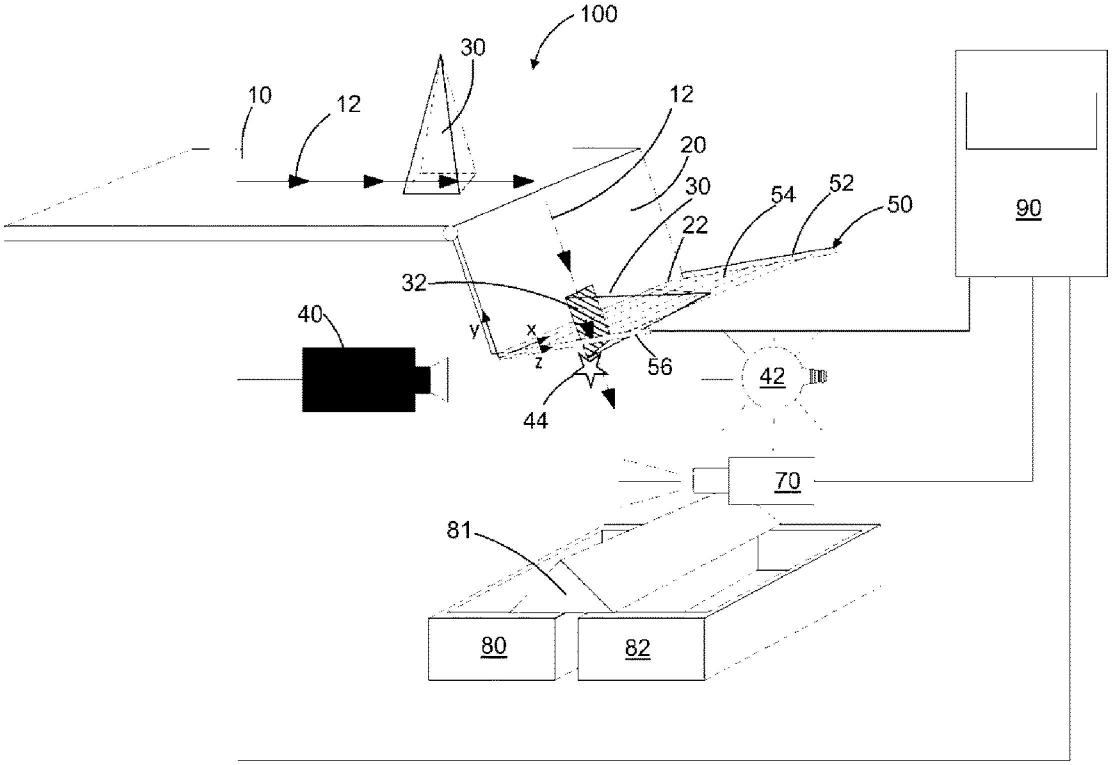

This application is a U.S. National Phase application of PCT Application NO. PCT/EP2022/079552 filed on Oct. 24, 2022, which is incorporated by reference herein in its entirety.

The invention relates to a method for sorting silicon chunks.

Polycrystalline silicon (polysilicon) is conventionally produced by the Siemens method (chemical vapour deposition process). In this case, in a reactor, filament rods (thin rods) of silicon are heated by a direct flow of current through them and a reaction gas containing a silicon-containing component (for example monosilane or halosilane) and hydrogen is introduced. The surface temperature of the filament rods is conventionally more than 1000° C. At these temperatures, the silicon-containing component of the reaction gas is decomposed and elemental silicon is deposited from the gas phase as polysilicon on the surface of the rod, so as to increase the diameter of the rod. After a predetermined diameter has been reached, the deposition is stopped and the polysilicon rods obtained are removed.

Polysilicon is the starting material for the production of monocrystalline silicon, which is produced for example by means of the Czochralski method. It is furthermore required for the production of multicrystalline silicon, for example by means of ingot casting. For both methods, it is necessary to comminute the polysilicon rods into chunks. The chunks are conventionally classified in separating devices according to their sizes.

The separating devices may be multistage screening machines which classify the fragmented polysilicon mechanically in different size classes. For example, U.S. Pat. No. 6,375,011 B1 discloses a vibratory conveyor which allows classification in three size classes.

An improvement of the separation, or even separation according to optical criteria, may be achieved by optopneumatic sorting facilities. US 2007/0235574 A1 discloses such a facility, which is arranged downstream of a comminuting device for polysilicon. The shadow area, projected into a plane, of the comminuted polysilicon chunks is in this case used for the size separation.

Furthermore, U.S. Pat. No. 6,265,683 B1 describes an optopneumatic device for classifying semiconductor materials, the size separation being performed with camera assistance by means of recording a projected area of materials to be sorted. Optionally, sorting of the materials according to their surface condition may also be carried out here.

In the known methods which are based on a two-dimensional (2D) projection of chunks using the transmitted-light method, a disadvantage is that the chunks are recorded only from one side. Chunks may differ greatly in respect of their shape. It may for instance happen that a chunk is oriented unfavourably at the instant when its projected area is recorded, in such a way that its longest extent lies in front of or behind the projected area (i.e. perpendicularly with respect to the projected area). The consequence is an incorrect estimation of the chunk size (sorting error).

This problem has given rise to the object of the invention, namely to provide an improved sorting method in which the orientation of the chunks to be sorted plays only a secondary role.

This object is achieved by a method for sorting chunks, in particular silicon chunks, comprising the following steps.

Singulating the chunks in a singulating region,

Recording the projected area of a chunk in a 2D profile plane with at least one first measuring device, Recording at least one height information item above and/or below the 2D profile plane with at least one further measuring device, Calculating the size of the chunk from the projected area and the height information item, Controlling at least one deflecting device as a function of the calculated size.

By the further measuring device, it is possible to supplement the projected area of the chunk, acquired with the aid of the first measuring device, with height information. The measuring devices are in this case preferably arranged at different positions around the chunk and thus inspect the latter from different viewing angles. Information items relating to the extent of the chunk above and/or below the profile plane (in the direction of the applicate axis (z axis)) may thereby be obtained so as to prevent a sorting error. In this way, the quality of the separation is improved.

The chunks are preferably comminuted polysilicon, for example comminuted polysilicon rods from the Siemens method.

The singulation of the chunks is intended, in particular, to mean that the chunks are distanced from one another and are thus no longer arranged above one another or partially overlapping. This may, for example, be carried out by a shaking movement a conveyor belt. It is not absolutely necessary for the chunks to be arranged in a row (behind or next to one another) for the recording by the measuring device.

Preferentially, the first measuring device and at least one of the further measuring devices are photoelectric transmitted-light or reflected-light measuring systems having a detection region through which the chunk passes.

Preferably the silicon chunk passes through the detection region in freefall.

The reflected-light measuring system preferentially comprises a light section sensor and/or at least one camera system.

The light section method carried out with the light section sensor is based on optical triangulation and requires a relative movement of the sensor and the chunk. The chunk is in this case illuminated linearly with the aid of a suitable light source and the resulting light stripe is recorded by means of an area scan camera (a constituent part of the sensor). The surface normals of the light source and of the camera are in this case tilted relative to one another by a triangulation angle.

The camera system may in principle also be only a camera which records the projected area of the chunk with the aid of ambient light as a light source. Preferably, however, the camera is supplemented with an external light source.

The camera system may furthermore be a camera system for photometric stereo analysis. This is a method for the analysis of projected areas and reflections of a surface of an object (chunk) in three-dimensional (3D) space. Conventionally, an external light source is directed onto the object and is moved in order to acquire a plurality of images of the resulting light scenarios. For moving objects such as a chunk in freefall, instead of the moving light source use is made of a plurality of cameras having different viewing angles. Alternatively, it is possible to use a plurality of light sources respectively having a different illumination direction and one camera, or a plurality of light sources and a plurality of cameras in combination.

The transmitted-light measuring system preferably comprises a photoelectric barrier, a light curtain or a light grid. In this case, light beams (for example infrared beams) are emitted from an optical emitter (photoelectric barrier) or a plurality of emitters spaced apart from one another (light grid/light curtain) to the corresponding receivers. If one or more of the beams are interrupted, a signal may be sent to a device and, for example, a deflecting device may consequently be triggered. The resolution of light grids and light curtains may be determined by the distance between the beams. Typical examples of such measuring systems are optical micrometers, light band micrometers, profile projectors, CCD laser micrometers and laser sensors with a photoelectric barrier function.

According to one preferred embodiment, the first measuring device is a camera system, in particular comprising a light source and a camera for recording the projected area.

The further measuring device is preferentially a light curtain or a light grid, particularly when a camera system has been selected as the first measuring device.

Preferably, the recording of the projected area and the recording of the height information item take place with a time spacing of from 0 to 100 ms, preferentially from 0 to 50 ms, particularly preferentially simultaneously. A time spacing that is as short as possible ensures that the position of the chunk does not change substantially, particularly in freefall.

The deflecting device, which is responsible for the sorting of the chunks, may be a pneumatic and/or mechanical deflecting device.

The pneumatic deflecting device preferably comprises at least one nozzle from which gases (for example air, inert gas) or liquids (for example high-purity water) are ejected at pressures of from 3 to 20 bar. In this regard, reference may be made to U.S. Pat. No. 6,265,683 B1.

The method according to the invention is preferably an optopneumatic classification method.

The calculation of the size of the chunk may be performed using an evaluation device (for example a software-aided process control station, for example MATLAB (from the company Math Works)) which is connected both to the measuring devices and to the deflecting device.

The basic measurement information which is obtained with the first measuring device is the projected area of the chunk, in which an information item relating to the shape of the chunk is contained, even if only in 2D as a contour. From the projected area, the evaluation device can obtain various length specifications, in diameters, which allow conclusions about the size of the chunk. In general, numerous methods are known for determining the length specifications or diameters. For example, determination of the diameter derived from an equivalent circle (perimeter equivalent diameter) or determination of a Feret diameter, which involves a whole group of characteristic quantities, all of which are defined by the distance between two tangents to the contour of the projected area in a fixed measurement direction.

The height information item obtained by means of the further measuring device, for example a photoelectric barrier, may in particular be a height value (unit of length). The combination of the acquired measurement information items is then, for example, a 3D point cloud consisting of the contour acquired with the first measuring device and a contour displaced by the height value.

A calculation of the greatest extent may be carried out from the length of a vector between the points lying furthest away from one another:

Point cloud as vector X={[x1,y1,z1], [x2,y2,z2], . . . , [xn,yn,zn]}

Combination of all points with one another and calculation of the distance in 3D:

$$L(i,j)=\left[(xi-xj)^2+(yi-yj)^2+(zi-zj)^2\right]^{0.5}$$

Determination of the maximum value of L(i,j).

The more detailed the height information items of the further measuring device is, the smaller the measurement error is.

A further aspect of the invention relates to a device for sorting chunks, in particular silicon chunks, comprising a singulating region for singulating the chunks, at least one first measuring device for recording the projected area of a chunk in a 2D profile plane, at least one further measuring device for recording a height information item above and/or below the 2D profile plane, at least one deflecting device, an evaluation device which calculates a size of the chunk from the projected area and the height information item and controls the deflecting device as a function of this size.

Preferably, the device is a device for carrying out the described method.

The singulating region preferably comprises at least one vibrating conveyor trough and/or conveyor belt. Optionally, the singulating region may also contain a screening plate or a shaking screen for removing fine fragments. In general, it may also be the segment of a conveyor belt, onto which the chunks are applied individually. Suction for dust particles may likewise be provided. The singulating region is preferentially a singulating region as described in EP 0 983 804 A1.

Preferentially, the device comprises a multiplicity of first and/or further measuring devices in order to allow high-throughput sorting. By a multiplicity of measuring devices in combination with a high computing power of the evaluation device, the distance between singulated chunks may be reduced to a minimum.

Preferably, the deflecting device is a pneumatic or mechanical deflecting device, in particular a pneumatic deflecting device which comprises a row or a matrix of individual nozzles.

In respect of the measuring devices and the evaluation device, reference may be made to the comments above and to EP 0 983 804 A1.

FIG. 1: Device according to the invention having a light grid (transmitted-light measuring system).

Figure 2:
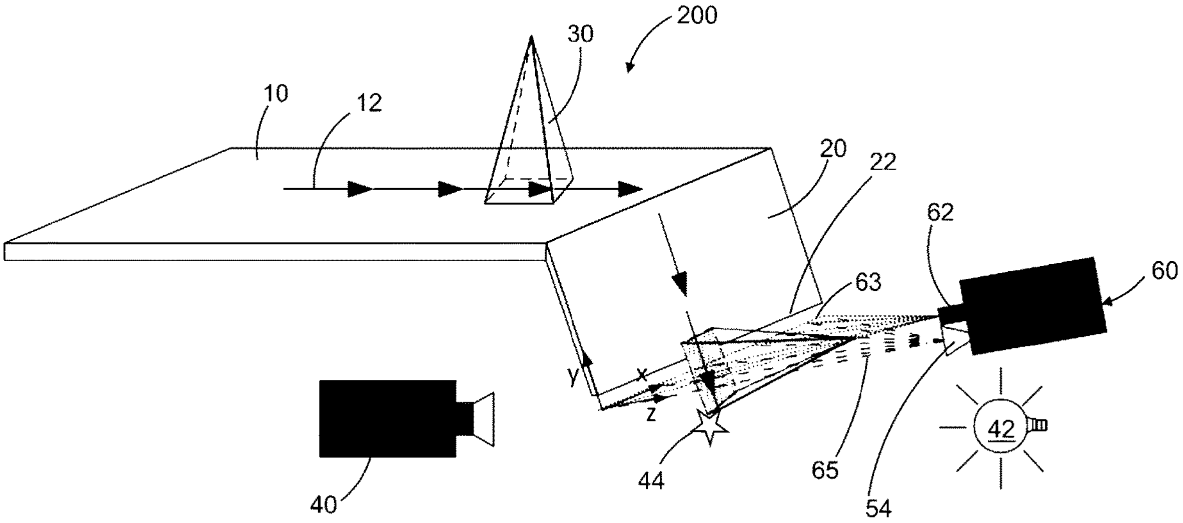

FIG. 2: Device according to the invention having a light section sensor (reflected-light measuring system).

LIST OF REFERENCES USED

10 vibrating conveyor belt
12 movement arrow
20 sliding surface
22 end of the sliding surface
30 chunk
32 projected area

40 camera
42 light source
44 detection region
50 light grid
52 emitter strip
54 IR beam path
56 receiver strip
60 light section sensor
62 laser scanner
63 static laser line
64 reception optics
65 reflected light
70 deflecting device
80 first collection container
81 separating element
82 second collection container
90 evaluation device
100 sorting device
200 sorting device FIG. 1 shows a sorting device 100, which comprises a vibrating conveyor belt 10 as a singulating region and an oblique sliding surface 20. The forward feed direction of singulated chunks 30 is indicated by means of movement arrows 12.

As a first measuring device, a camera 40 having an external light source 42 is arranged underneath the sliding surface 20. The camera 40 is, for example, a CCD camera having an optical resolution of from 0.05 to 2.0 mm. The light source 42 is, for example, an LED having diffuse area illumination. A detection region 44 of the first measuring device, in relation to the chunk 30, is indicated as a star. As a further measuring device, a light grid 50 is fitted at a lower end 22 of the sliding surface 20. It consists of an emitter strip 52 having a total of five infrared light sources (laser or LED light sources or light dots in the visible range may also be envisaged), the radiation of which is respectively indicated by a dashed line 54, and a receiver strip 56 which correspondingly has five sensors. Underneath the first measuring device there is a pneumatic deflecting device 70, and underneath the latter there are a first and a second collection container 80, 82. The collection containers 80, 82 are connected to one another by a separating element 81 which is triangular in cross section. Furthermore, both the sensor strip 56 of the first measuring device, the camera 40 and the light source 42 of the second measuring device, as well as the deflecting device 70 are connected to an evaluation device 90. The evaluation device is a computer with image processing software, for example MATLAB.

When a chunk 30, for example a pyramidal chunk, singulated by the shaking movement of the vibrating conveyor belt 10, now reaches the oblique sliding surface 20, it becomes oriented in such a way that its centre of gravity lies as low as possible. This may generally be adapted to the chunk size of the chunks by a sliding surface 20 that is adjustable in its angle. After the end of the sliding surface 22, the chunk 30 passes through the light grid 50 in such a way that its elongated side faces in the z direction, and it is thus recorded in its full length by the light grid 50. The chunk 30 subsequently passes in freefall through the detection region 44 of the camera 40, the latter only recording a projected area 32 corresponding to the base face of the chunk 30. From the two information items, i.e. the projected area 32 and the height information item acquired by the light grid 50, the evaluation device 90 calculates the size of the chunk 30 and forwards this information to the pneumatic deflecting device 70, undeflected chunks 30 being collected in the second collection container 82 and the chunks 30 deflected by a pneumatic pulse being collected in the first collection container 82. The separating element 81 facilitates this separation.

FIG. 2 shows a further sorting device 200 according to the invention, which corresponds substantially to the sorting device of FIG. 1 (elements which correspond to one another have corresponding references; the representation of the evaluation device, deflecting device and collection containers has been omitted). The sorting device 200 has a light section sensor 60 as a further measuring device. It consists of a laser projector 62 and reception optics 64. The light section sensor 60 uses the triangulation principle to ascertain the height information item (3D profile recording). By means of special optics, a laser beam is broadened to form a laser line 63 (represented by the finely dashed lines) and projected onto the surface of the chunk 30 passing through. The reception optics 64 image the light 65 reflected by the surface (this light being represented by the coarsely dashed lines) on a sensor matrix. An evaluation device (not shown) connected to the light section sensor 60 can calculate the height information item of the chunk passing through (z axis) from the acquired matrix image along the laser line (x axis). This information item may then be output in a two-dimensional coordinate system which is fixed with respect to the sensor. In the case of moving objects or when crossing the sensor, 3D measurement values may additionally be acquired.

COMPARATIVE EXAMPLE 1

Classification of comminuted (crushed) polysilicon having a chunk size (CS) 2.

The size class of polysilicon chunks is defined as the longest distance between two points on the surface of a silicon chunk (corresponding to the maximum length):

| | |
|---|---|
| CS0 | 0.1 to 5 mm |
| CS1 | 3 to 15 mm |
| CS2 | 10 to 40 mm |
| CS3 | 20 to 60 mm |
| CS4 | 45 to 120 mm |
| CS5 | 100 to 250 mm |

The polysilicon sample material used for the test was produced from a mixture of 9000 chunks in the length range of from 10 to 40 mm (CS2) and 1000 chunks in the length range >40 to 65 mm, namely the fraction to be separated. In order to prepare the sample material, a mechanical screening method (analysis screen according to DIN ISO 3310-2 with a normal hole width W=4 mm (square perforation)) was used to remove the chunk fractions of from 0 to 10 mm. The maximum length both of the chunks in the length range of from 10 to 40 mm and of the chunks of the fraction to be separated in the length range of from 40 to 65 mm was determined manually (vernier calliper) and the polysilicon sample material was then mixed.

This polysilicon sample material was subjected to conventional optopneumatic sorting of the fraction >40 mm.

The optopneumatic sorting device used was equipped with a first 2D measuring device (CCD camera and light source according to FIG. 1) for recording a projected area of the chunks. The chunks passed through the detection region of the measuring device individually (conventionally with a distance of 0.5-10 mm between the chunks) over an oblique sliding plane. The measuring device was coupled to an evaluation device at a process control station. The deflecting device, comprising an approximately 50 cm wide nozzle strip having two rows of 100 nozzles each, was also connected to this control station. A separating interval of 40 mm was set at the control station.

At the end of the sorting, the slippage of the separating method was determined by manual analysis (vernier calliper) in conjunction with manual counting of the chunks. It was 0.1%.

EXAMPLE 1

The polysilicon sample material described in the comparative example was separated with an optopneumatic sorting device having substantially the same design (with a separating interval of 40 mm). In contrast to Comparative Example 1, however, the device had a second 2D measuring device. This was a light grid as described with reference to FIG. 1.

One possible way of evaluating the information items acquired by the measuring devices is presented below, this having been carried out with MATLAB (from the company Math Works).

- The image recording with the first measuring device is configured as a row of sensors and, per unit of time, delivers the shadow cast by the chunks as a vector x with greyscale values [0 . . . 255].
- At the same time, a value of the height information item is recorded with the second measuring device: scalar z in [mm].
- The individual measurements are combined as a function of time t to form an image: image [x,y] with greyscale values [0 . . . 255, 0 . . . 255].
- The height information items are combined as a function of time t to form a vector and are assigned to the ordinate: vector [z] with values in [mm].
- Repeated evaluation of the images formed in this way is carried out.
- By means of an adjustable greyscale value (for example the greyscale value 128), the greyscale values [0 . . . 255] are converted into binary values [0=dark or 1=bright].
- By searching for continuous regions with [0=dark] in the image, a list of chunks is acquired.
- Repeated calculation is carried out for each chunk.
- Calculation of the points at the edge of the region as a list and conversion into [mm]: list [xi,yi] in [mm].
- Allocation of the height values to the list: [xi,yi,zi] in [mm].
- Calculation of the maximum distance in 3D for all points of the list [xi,yi,zi] with respect to one another: scalar for the maximum extent in [mm] of the chunk.
- If an adjustable limit value in [mm] for the maximum extent of the chunk is exceeded, an instruction is given to blow out the chunk in the region of the nozzle strip in which the chunk is located [min(xi), max(xi)].

The slippage after this sorting was manually established as described above, and was 0.0%.

COMPARATIVE EXAMPLE 2

Classification of comminuted polysilicon in CS3.

First, polysilicon sample material consisting of 9000 chunks in a length range of from 20 to 60 mm (CS3) and 1000 chunks in a length range >60 to 85 mm (the fraction to be separated) was produced.

The verification of the chunk lengths was carried out manually. Following this, the polysilicon sample material was made up by mixing.

The polysilicon sample material was sorted with the optopneumatic sorting device described in Comparative Example 1, but with a separating interval of 60 mm.

The slippage after this sorting was manually established as described above, and was 1.0%.

EXAMPLE 2

The polysilicon sample material described in Comparative Example 2 was in this case sorted with an optopneumatic sorting device according to FIG. 2. It thus had a second measuring device in the form of a light section sensor consisting of a laser projector and reception optics.

The slippage after this sorting was manually established as described above, and was 0.0%.

It was possible to show that the sorting outcome can be significantly improved, particularly in the case of pyramidal objects, by an additional height information item determined by means of a second measuring device. The aim of any sorting is essentially a clean separating interval without slippage in respect of a chunk size.

The invention claimed is:

1. Method for sorting chunks, comprising the steps of:
- singulating the chunks in a singulating region;
- recording the projected area of a chunk in a 2D profile plane with at least one first measuring device;
- recording at least one height information item above and/or below the 2D profile plane with at least one further measuring device;
- calculating the size of the chunk from the projected area and the height information item; and
- controlling at least one deflecting device as a function of the calculated size;
- wherein the first measuring device is a photoelectric transmitted-light or reflected-light measuring system having a detection region through which the chunk passes in freefall and the further measuring device is a light curtain or a light grid; and
- wherein the recording of the projected area and the recording of the height information item take place with a time spacing of from 0 to 100 ms.

2. The method of claim 1, wherein the reflected-light measuring system comprises a light section sensor and/or at least one camera system.

3. The method of claim 2, wherein the camera system is a camera system for photometric stereo analysis.

4. The method of claim 1, wherein the transmitted-light measuring system comprises a photoelectric barrier, a light curtain or a light grid.

5. The method of claim 1, wherein the first measuring device is a camera system.

6. The method of claim 1, wherein the recording of the projected area and the recording of the height information item take place with a time spacing of from 0 to 100 ms.

7. The method of claim 1, wherein the deflecting device is a pneumatic or mechanical deflecting device.

8. Device for sorting chunks, comprising:
- a singulating region for singulating the chunks;
- at least one first measuring device for recording the projected area of a chunk in a 2D profile plane;
- at least one further measuring device for recording a height information item above and/or below the 2D profile plane;

at least one deflecting device; and a software-aided controller which calculates a size of the chunk from the projected area and the height information item and controls the deflecting device as a function of this size; and wherein the first measuring device is a photoelectric transmitted-light or reflected-light measuring system having a detection region through which the chunk passes in freefall and the further measuring device is a light curtain or a light grid.

9. The device of claim 8, wherein the singulating region comprises at least one vibrating conveyor trough and/or conveyor belt.

10. The device of claim 8, wherein the deflecting device is a pneumatic or mechanical deflecting device.

11. The device of claim 10, wherein the pneumatic deflecting device comprises a row or a matrix of individual nozzles.

* * * * *